United States Patent
Bheemarajaiah et al.

(10) Patent No.: US 9,596,127 B2
(45) Date of Patent: Mar. 14, 2017

(54) SCALABLE DATA FEED SYSTEM

(75) Inventors: Anand Bheemarajaiah, Ithaca, NY (US); Manas Garg, Hyderabad (IN); Sandeep Prabhu, Hyderabad (IN); Krishnan Srinivasan, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1132 days.

(21) Appl. No.: 13/400,555

(22) Filed: Feb. 20, 2012

(65) Prior Publication Data

US 2013/0219009 A1    Aug. 22, 2013

(51) Int. Cl.
*G06F 15/16* (2006.01)
*H04L 12/24* (2006.01)
*H04L 29/08* (2006.01)
*H04L 12/18* (2006.01)

(52) U.S. Cl.
CPC .......... *H04L 41/046* (2013.01); *H04L 67/10* (2013.01); *H04L 67/2842* (2013.01); *H04L 12/1859* (2013.01)

(58) Field of Classification Search
CPC . H04L 67/10; H04L 67/2842; H04L 67/2847; H04L 67/2838; H04L 67/2823; H04L 67/2809; H04L 67/26
USPC ................ 709/202, 203, 217, 218
See application file for complete search history.

(56) References Cited

U.S. PATENT DOCUMENTS 6,314,108 B1 * 11/2001 Ramasubramani et al. .. 370/465
6,470,389 B1 * 10/2002 Chung et al. ................. 709/227
6,604,104 B1    8/2003 Smith
7,284,035 B2    10/2007 Yu et al.
7,650,620 B2    1/2010 Fish et al.
7,721,337 B2    5/2010 Syed
2001/0052015 A1 * 12/2001 Lin et al. ...................... 709/226
2002/0165952 A1   11/2002 Sewell et al.

(Continued)

OTHER PUBLICATIONS

Juvva, et al., "A Real-Time Push-Pull Communications Model for Distributed Real-Time and Multimedia Systems", Retrieved at <<http://citeseerx.ist.psu.edu/viewdoc/download?doi=10.1.1.54.2926&rep=rep1&type=pdf>>, Proceedings of Technical Report CMU-CS-99-107, School of Computer Science, Carnegie Mellon University, Jan. 1999, pp. 25.

(Continued)

*Primary Examiner* — David Lazaro
(74) *Attorney, Agent, or Firm* — Ben Tabor; Kate Drakos; Micky Minhas

(57) ABSTRACT

A scalable data feed system is disclosed. The data feed system may be offered as a cloud service that can serve many enterprises or tenants that require data to be pulled from information sources such as FTP, POP3, databases, line of business systems, a topic subscription, or an RSS feed, and pushed the data to information sinks, such as SMTP, email, FTP, mobile phones, and other devices and services. A pull agent pumps data from pull sources and pushes the data out to push agent counterparts. The push agent transforms and sends the data in messages to push sink, such as FTP, SMTP, or a mobile device. Both the pull agent and the push agent services are implemented as replicated services over a structured overlay network for high availability that can serve multiple requests to pump out data from multiple pull sources and push the data to multiple information sinks.

12 Claims, 4 Drawing Sheets

(56) References Cited

U.S. PATENT DOCUMENTS

| | | | |
|---|---|---|---|
| 2003/0014483 A1* | 1/2003 | Stevenson et al. | 709/203 |
| 2005/0193096 A1* | 9/2005 | Yu et al. | 709/219 |
| 2007/0003023 A1 | 1/2007 | Rolia et al. | |
| 2007/0183354 A1* | 8/2007 | Schuelke et al. | 370/312 |
| 2007/0260674 A1* | 11/2007 | Shenfield | 709/203 |
| 2009/0042549 A1* | 2/2009 | Lee | 455/414.4 |
| 2010/0100952 A1* | 4/2010 | Sample et al. | 726/9 |
| 2011/0040848 A1* | 2/2011 | Xu | 709/213 |
| 2013/0219009 A1* | 8/2013 | Bheemarajaiah et al. | 709/217 |

OTHER PUBLICATIONS

Nehab, Diego, "Filters Sources and Sinks", Retrieved at <<http://lua-users.org/wiki/FiltersSourcesAndSinks>>, Proceedings of Lua Programming Gems. Lua.org (2008), 2008, pp. 13.

* cited by examiner

FIND LIST OF WORK ITEMS FOR THE CURRENT POLL
401

↓

WORK ITEM
PRE-PROCESS QUEUE
402

↓

DOWNLOAD THE DATA FROM EXTERNAL SERVER
403

↓

WORK ITEM
STREAM QUEUE
404

↓

UPLOAD FILES TO PUSH AGENT SERVICE
405

↓

WORK ITEM
POST-PROCESS QUEUE
406

↓

DELETE FILES FROM THE EXTERNAL SERVER
407

SCALABLE DATA FEED SYSTEM

BACKGROUND

Developers often design applications that are loosely coupled to each other instead of being tightly linked. This configuration is advantageous and beneficial, but introduces the problem of how to gather and distribute information that spans the application. This problem may be further compounded if the line between the applications and the enterprise or consumer is not well defined. Information or data is often required to be collected from many sources or endpoints and distributed to many destinations or sinks. For example, an enterprise application may push data to a social media platform or to mobile devices. The data may come from an information source such as an RSS feed or a Topic Pub/Sub.

Traditionally, the problem of distributing data is solved by developing a "one-off" or custom solution that pumps data between specific information sources and sinks. Generally, the data pump has to poll information sources, which may use a lot of compute resources, and thereby requires a dedicated machine to poll the information sources. This configuration causes additional problems because pull sources may or may not have data available at all times. This causes spikes in the compute requirements when data is available and wasted resources when the pump is simply polling to see if data exists. In some configurations, this is addressed by providing a notification or activation message when data becomes available. These notification mechanisms may be built into information pull sources such as queues.

Historically, data feed systems were limited because the data pump must be close to either the pull source or the push sink and is generally built stand-alone or purpose-built application that is not capable of future connectivity or integration with other systems. Polling from the pull sources can require a lot of compute resources that could be put to better use. Additionally, getting data from a pull source to a push sink invariably requires some kind of transformation of the data that is generally hand coded.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a scalable data feed system is offered as a cloud service serving many enterprises or tenants that require data to be pulled from various information sources, such as FTP servers, POP3 services, databases, line of business systems, etc., and pushed to information sinks, such as SMTP or email services, FTP servers, mobile phones, databases, and other devices.

Embodiments of the system include, but are not limited to, the following aspects and features. Pull agents and their counterpart push agents accommodate efficient pumping of data. The pull agents and push agents are scalable and are configured on top of a structured overlay network. The pull and push agent services may be independently scaled. The generic design and implementation of the pull agent allows it to pull from any passive data source. The generic design and implementation of the push agent allows it to push data to any information sink. The data may be transformed as it is sent between the pull agent and the push agent or by the pull agent or the push agent.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figures 1, 4:
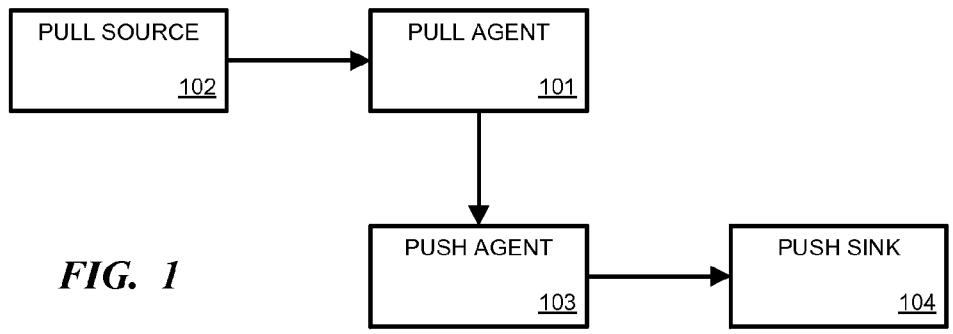
FIG. 1 is a block diagram illustrating components of a data feed system according to one embodiment.
FIG. 4 illustrates three queues used to represent a single pull endpoint according to one embodiment.

FIG. 1 is a block diagram illustrating components of a data feed system. A pull agent 101 is a genericized pump that pumps data from a pull source 102, such as an FTP server, topic subscription, RSS feed, POP3 service, database, line of business system, etc., and pushes the data out to a counterpart push agent 103. Push agent 103 is a genericized pump that can transform and send messages to a push sink 104, such as an SMTP or email service, FTP server, mobile phone, and other devices or services. Both pull agent 101 and push agent 103 may be implemented as replicated services over a structured overlay network to provide high availability with the capability to serve multiple requests to pump out data from pull source 102 and push the data to push sink 104.

Figure 2:
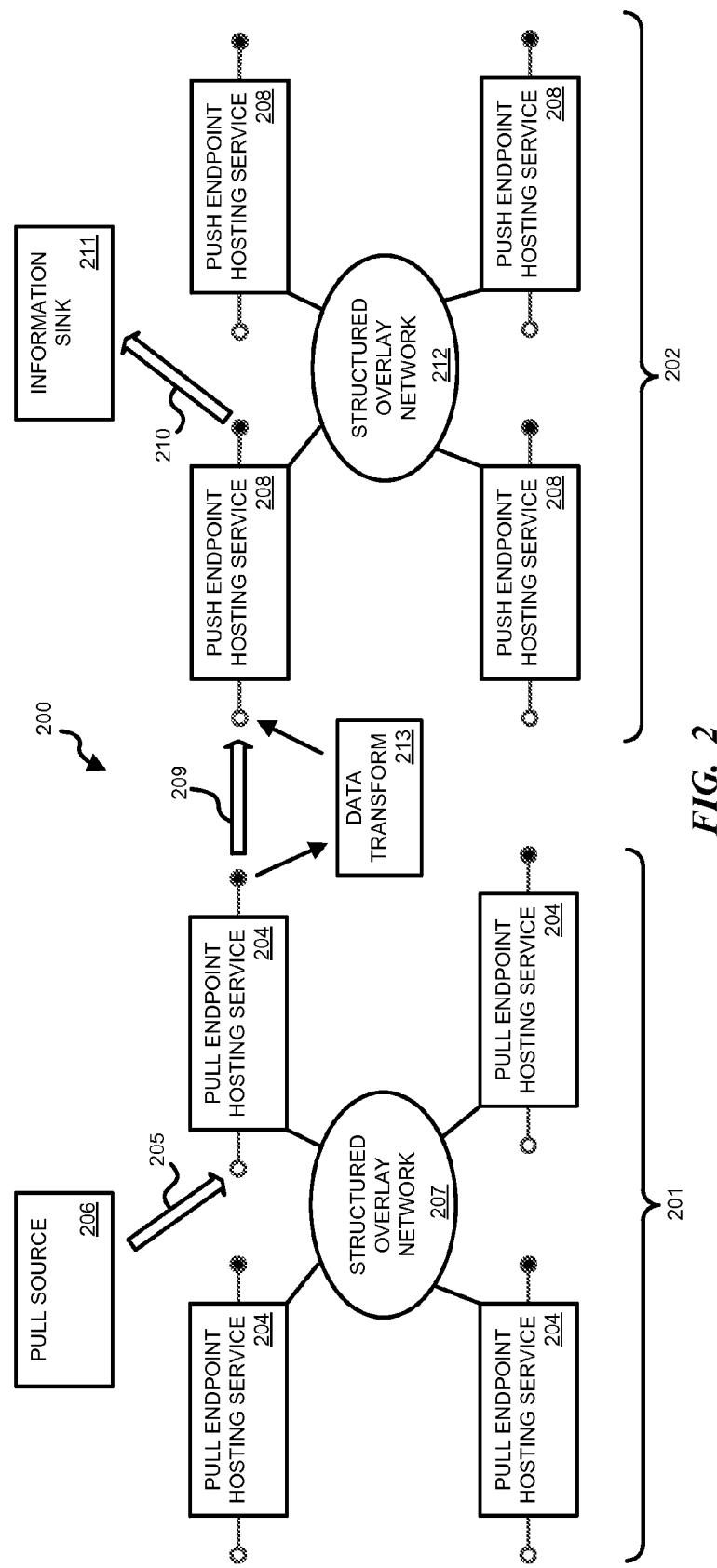
FIG. 2 is a high level block diagram of a scalable data feed service or pump service according to one embodiment.

FIG. 2 is a high level block diagram of a scalable data feed service or pump service 200 according to one embodiment. The scalable data feed service 200 is implemented by two services: a pull agent service 201 and a push agent service 202.

Pull agent service 201 comprises a collection of pull endpoint hosting services 204 that pull data 205 from pull sources 206. Pull endpoint hosting services 204 are replicas or instances that partition work among themselves, which allows the pull agent service 201 to scale as necessary. The pull sources 206 may be external pull sites, such as an FTP or mail server, or internal sources, such as a topic subscription or database, for example. Pull sources 206 are partitioned among the replicas 204. The replicas 204 are responsible for their assigned set of sources 206. The replicas 204 are on top of a structured overlay network 207 to provide high availability.

Push agent service 202 comprises a collection of push endpoint hosting services 208 that receive data 209 from pull endpoint hosting services 204 and push the data 210 to information sinks 211. Push endpoint hosting services 210 are replicas that partition work among themselves to allow for scaling of the push agent service 202. The replicas 208 partition work by partitioning the information sinks 211 where each replica 208 sinks data. The replicas 208 are on top of a structured overlay network 212 to provide high availability.

Both pull agent service 201 and push agent service 202 may be partitioned for scale. Additionally, if one of the pull endpoint hosting service 204 or push endpoint hosting service 208 fails or is otherwise unavailable, one of the other replicas will take over the failed replica's workload.

To simplify the diagram, only one pull source 206 and one information sink 211 are shown; however, it will be understood that additional pull sources 206 (not shown) are associated with each pull endpoint hosting service 204 and that additional information sinks 211 are associated with each push endpoint hosting service 208. As illustrated in FIG. 2, the pull and push networks in scalable data feed service 200 may have a symmetrical design, but may differ in their scale characteristics in one embodiment. The data feed service 200 is highly scalable by partitioning of work among the pull endpoint hosting services 204 and the push endpoint hosting services 208 and by controlling how the pull agent service 201 schedules and pulls data stream 205 from pull sources 206 and delivers the data 209 to push agent service 202.

Push agent service 202 can be further partitioned into a push rendering system that renders data in a form suitable for information sink 211 and a push distribution system that is specific to each information sink 211. The push rendering systems and push distribution systems may be distributed and scaled independently, or they may be implemented together in the push endpoint hosting service 208.

Pull hosting service 204 schedules a pull job from information source 206 and gets data 205, which may be read as a stream from pull source 206. Pull endpoint hosting service 204 downloads the data stream either in parallel or sequentially based on the configuration of the pull endpoint. In one embodiment, the pulled data 206 is then converted to an internal SOAP-based protocol and pushed 209 out to the push agent service 202.

Before pushing data 209, an address resolution is performed based on the address of information sink 211 to ensure that data 209 is sent to the correct push endpoint hosting service 208 that is responsible for the information sink 211. Structured overlay network 212 may maintain a table or database to assist in identify how the push endpoint hosting services 208 are partitioned among the information sinks 211.

Data 209 may be transformed 213 to meet the specific protocol needs of the information sink 211. This protocol is published by the push agent service 202. For every new information sink 211, push agent service 202 defines a SOAP-based protocol, with appropriate SOAP headers and interpretation, and creates a new runtime push endpoint hosting service 208 replica for that protocol. Based on the transformation desired by the user, the pull endpoint hosting service 204 may transform the downloaded stream 205 into a protocol required by push agent service 202. In other embodiments, a pipeline component may perform transformations between the pull agent and the push agent. For example, the pull agent may perform some basic transforms, and a dedicated pipeline component between the pull agent and the push agent performs more elaborate transformations. The push endpoint hosting service 208 receives the incoming message 209 and translates the data 209 to the protocol or format specific to the information sink 211.

Figure 3:
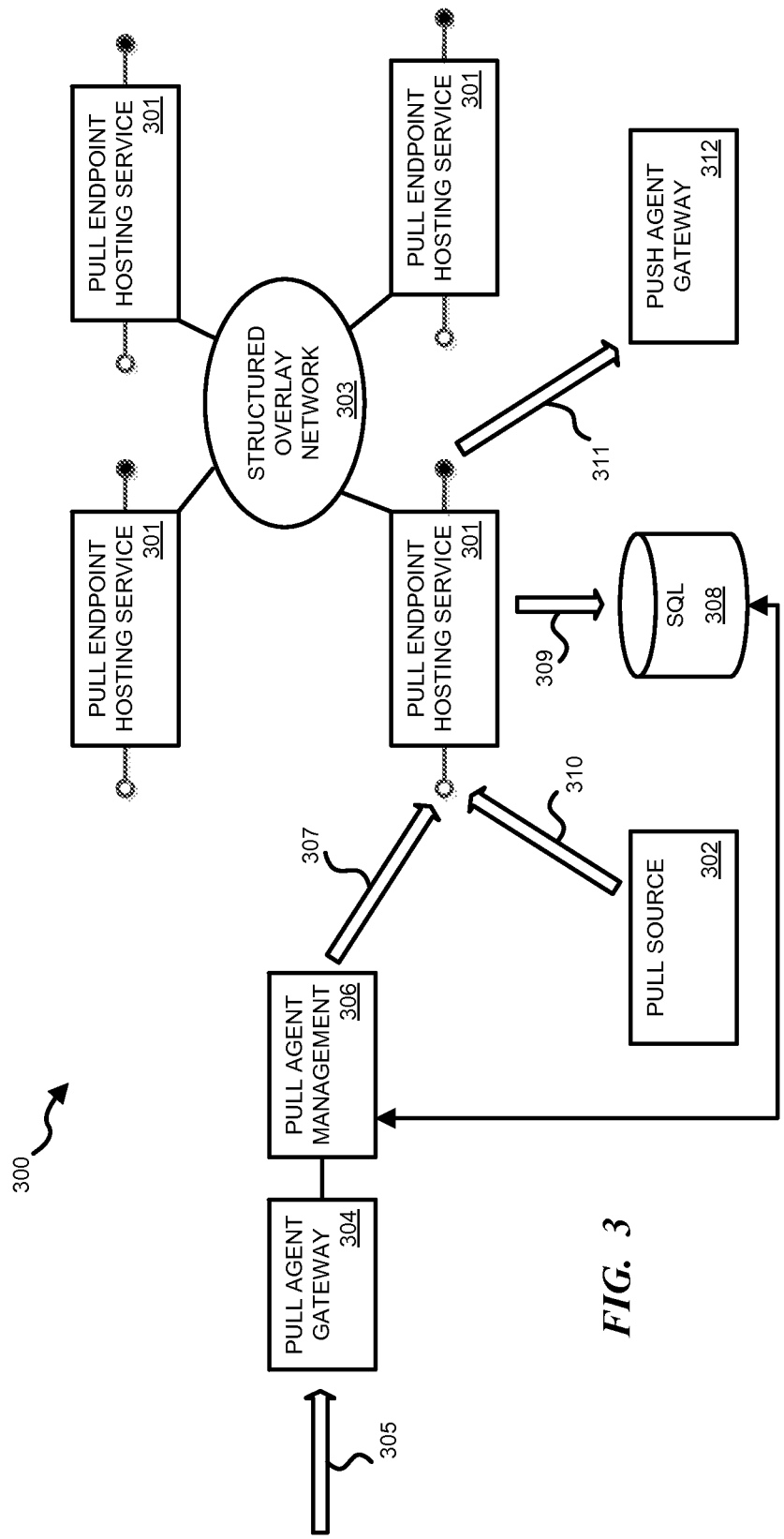
FIG. 3 is a block diagram of a pull agent service according to one embodiment.

FIG. 3 is a block diagram of a pull agent service 300 according to one embodiment. The pull agent service 300 hosts a service—referred to herein as the pull endpoint hosting service 301—that hosts many pull source 302. A pull source 302 describes a specific information source, and the pull agent service 300 pulls data from these sources 302. In one embodiment, the pull endpoint hosting service 301 is a stateful service that allows for scaling of the pull agent service 300 in the form of pull agent service replicas 301 over a structured overlay network 303.

The pull agent service has a gateway 304 that provides an external user interface. The pull agent gateway 304 may provide a Representational State Transfer (REST) interface in one embodiment. The gateway receives configuration information identifying new information sources 302 and requests to pull data from the information sources 302. Users enter requests 305, such as GET, PUT, and DELETE requests, at pull agent gateway 304, which is the only means for users to operate on the endpoints to perform actions, such as get, create, update, or delete operations.

A pull agent management provider 306 is responsible for either servicing the requests coming from gateway 304, such as GET requests, or forwarding the requests, such as PUT and DELETE requests, as a message 307 to the appropriate pull endpoint hosting service 301. Pull agent management provider 306 may assign a pull endpoint hosting service 301 responsibility for a particular pull source 302. The pull endpoint hosting service 301 stores 309 the endpoint configuration to a database 308, such as a SQL database. Pull agent management provider 306 reads endpoint configuration information from database 308 directly when it receives a request for the pull source 302 to identify which pull endpoint hosting service 301 is responsible for that source 302.

The pull endpoint hosting service 301 is responsible to poll the pull source 302, which may be a poll to an external FTP server for example, and then download data 310 from the pull source 302. Once the contents are downloaded from the pull source 302, the pull endpoint hosting service 301 creates a message 311, such as an HTTP or SOAP message, using the data and passes the message 311 on to a push agent gateway 312. The push agent gateway 312 address may be provided as part of the pull endpoint configuration information stored to database 308.

The pull agent service 300 is a scheduler that schedules many pull sources 302, which represent information sources from which data is pulled. The pull agent 300 is configured with a collection of pull sources 302 that are partitioned among the pull endpoint hosting services 301. Each pull endpoint hosting service 301 is responsible for pulling data from a set of specific information sources 302. This may be configured by hashing on the pull information source configuration. For example, in the case of an FTP server, the FTP server name, server port and user name may be used by the pull endpoint hosting service 301 to connect to the FTP service. In the case of another pull source 302 or information source, the hashing function uses a different set of inputs. The hashing logic may take co-location into account to optimize resource usage on the information source 302. The pull agent service 300 may also check for critical errors, such as authentication failure, during poll and may shut down the poll if critical errors are found, or if too many non-critical errors occur in a given poll or during a given time interval.

The structured overlay network 303 underneath the pull agent service 300 helps in providing high levels of scalability and availability. Each pull endpoint hosting service 301 is a stateful service, and the structured overlay network 303 notifies if there is a change in the network. For example, if there are one hundred pull sources 302 to pull data from and there are four pull endpoint hosting services 301 on the structured overlay network 303, then each pull endpoint hosting service 301 pulls data from approximately twenty-five pull sources 302. One or more machines or servers are used to host the pull endpoint hosting services 301. A state change in the network occurs, for example, if one of the hosting machines fails or if a new pull endpoint hosting service 301 is added to handle the pull agent workload. The structured overlay network 303 notifies each of the pull endpoint hosting service 301 of the change in how the pull sources 302 are partitioned. The pull endpoint hosting services 301 query the database 308, which stores the configuration data for all of the pull endpoints and how they are allocated to partitions. Each pull endpoint hosting service 301 fetches the set of pull sources 302 that it is responsible for scheduling and schedules jobs to pull data from the information sources 302.

In one embodiment, a pull endpoint or information has two parts: an implementation specific to the technology of the pull endpoint choice, such as FTP or a topic subscription; and a representation of the pull endpoint configuration, such as an address.

FIG. 4 illustrates three queues used to represent a single pull endpoint according to one embodiment. In step 401, upon scheduling a pull endpoint the pull agent begins identifying work items. The work items are single-line descriptions or metadata that define the information sought in the polls. The work items are stored to a pre-process queue 402, which will contain a list of references to the actual information source identities. In the case of FTP, for example, the work items are filenames.

Once work items are found and gathered, the pull agent begins downloading the data streams from the information sources in step 403, such as downloading files from an external FTP server. Based on the concurrency count, the downloading may be done in parallel. The contents of the data streams are queued in work item stream queue 404. When the data streams are downloaded, an HTTP or SOAP message is created based on the pull endpoint configuration to push the data out to a push agent service in step 405. The SOAP messages are queued in work item post-processing queue 406. Another thread will pick up these messages and will post them to the push agent service. The post-processing queue 406 will have an acknowledgement status for each data stream that was posted to a push agent service. Upon acknowledgment from the push agent service that the data has been pushed out successfully, the data may be deleted from the information source in step 407. Alternatively, in the case of a mail source, the data may be marked as read. This allows the data pump to support ALO (At Least Once) semantics on pull/push.

Once a pull endpoint has exhausted all of the work items, it reschedules the next poll. Rescheduling may be based on internal monitoring of errors and thresholds, for example. The following algorithm may be used for rescheduling in one embodiment:

1) If (ErrorCount/TotalItemCount) %>ErrorThreshold (70%) && ThrottledLevel==0
   a) ThrottledLevel=1.
   b) Set the ConcurrencyCount to 1.
   c) Continue with next poll.
2) If (ErrorCount/TotalItemCount) %>ErrorThreshold (70%) && ThrottledLevel>0
   a) If Throttledlevel==3 then call RequestShutdown else continue
   b) Increment the ThrottledLevel.
   c) Double the poll interval.
   d) Continue with poll.
3) If (ErrorCount/TotalItemCount) %<ErrorThreshold (70%) && ThrottledLevel>0
   a) Check if the ThrottledLevel is 1, in which case set the ConcurrencyCount to its original value.
   b) If the ThrottledLevel is greater than 1, then decrease poll interval by half
   c) Decrement Throttledlevel.
4) Repeat steps 1-3 for InternalErrorCount unless shutdown of endpoint is requested or throttling reaches zero.

Figure 5:
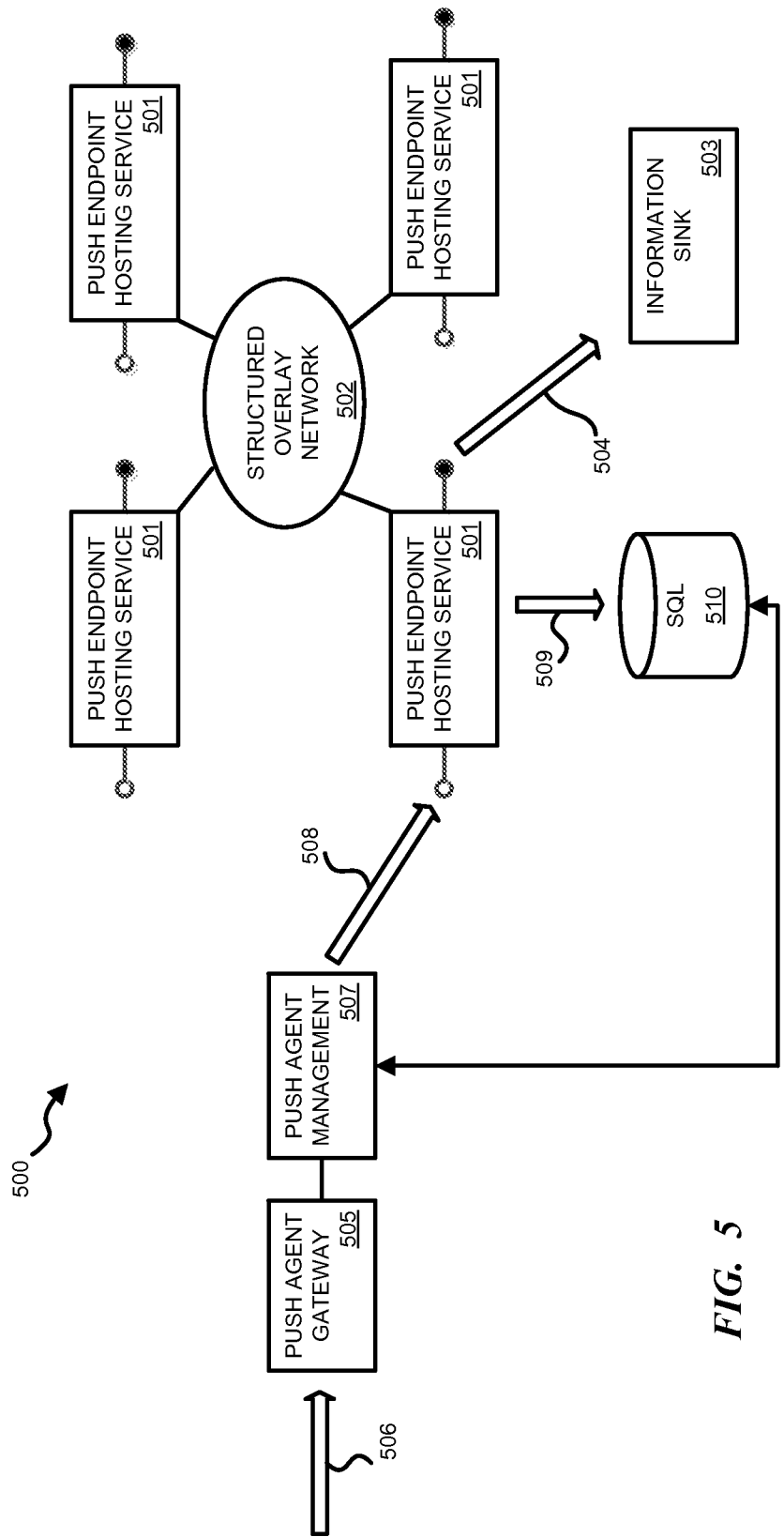
FIG. 5 is a block diagram of a push agent service according to one embodiment.

FIG. 5 is a block diagram of a push agent service 500 according to one embodiment. The push agent service follows a design that is symmetrical to the pull agent illustrated in FIG. 3. A collection of push agent hosting services 501 are hosted on a structured overlay network 502. In terms of availability and reliability, the push agent service 500 may follow the same model as pull agent service 300 to partition work. The push endpoint hosting service 501 may be broken into operations: the rendering or formatting of content suitable to an information sink 503 and the actual distribution of messages 504 to the information sink 503. Both of these operations may be partitioned and scaled out. In one embodiment, the push endpoint hosting service 501 is a stateful service that allows for scaling of the push agent service 500 in the form of push agent service replicas 501 over a structured overlay network 502.

The push agent service 500 has a gateway 505 that provides an interface for endpoint request messages 506. The push agent gateway 505 may provide a REST interface in one embodiment. The gateway receives configuration information identifying new information sinks 503 and requests to push data to the information sink 503.

A push agent management provider 507 is responsible for either servicing the requests coming from gateway 505 or forwarding the requests as a message 508 to the appropriate push endpoint hosting service 501. Push agent management provider 507 may assign a push endpoint hosting service 501 responsibilities for a particular information sink 503. The push endpoint hosting service 501 stores 509 the information sink configuration to a database 510, which may be the same database 308 as used in the pull agent service. Push agent management provider 507 reads endpoint configuration information from database 510 directly when it receives a request for the information sink 510 to identify which push endpoint hosting service 501 is responsible for that information sink 503.

The push agent service 500 is a reactive service that is triggered when a pull service sends a message to be transmitted. Push endpoints 501 represent information sinks to which data is pushed. The push agent 500 is configured with a collection of information sinks 503 that are partitioned among the push endpoint hosting services 501. Each push endpoint hosting service 501 is responsible for pushing data to a set of specific information sinks 503. This may be configured by hashing on the push information source configuration. For example, in the case of an FTP server, the FTP server name, server port and user name may be used by the push endpoint hosting service 501 to connect to the FTP service. In the case of another information sink 503, the hashing function uses a different set of inputs. The hashing logic may take co-location into account to optimize resource usage and to preventing denial-of-service attack detection on the information sink 503. The push agent service 500 may also check for critical errors, such as authentication failure, and send an error message back to the pull agent or may shut down the poll if critical errors are found.

The structured overlay network 502 underneath the push agent service 500 helps in providing high levels of scalability and availability. Each push endpoint hosting service 501 is a stateful service, and the structured overlay network 502 notifies if there is a change in the network. For example, if there are one hundred information sinks 503 to push data to and there are four push endpoint hosting services 501 on the structured overlay network 502, then each push endpoint hosting service 501 pushes data to approximately twenty-five information sinks 503. One or more machines or servers are used to host the push endpoint hosting services 501. A state change in the network occurs, for example, if one of the hosting machines fails or if a new push endpoint hosting service 501 is added to handle the push agent workload. The structured overlay network 502 notifies each of the push endpoint hosting service 301 of the change in how the information sinks 503 are partitioned. The push endpoint hosting services 501 query the database 510, which stores the configuration data for all of the information sinks 503 and how they are allocated to partitions. Each push endpoint hosting service 501 fetches the set of information sinks 503 that it is responsible for scheduling and schedules jobs to push data to the information sinks 503.

In one embodiment, a push endpoint or information has two parts: an implementation specific to the technology of the information sink choice, such as FTP or a mobile device; and a representation of the information sink configuration, such as an address.

Upon receipt of a message, the push agent service retrieves the external sink address and the endpoint configuration for that endpoint from database 510. An in-memory cache may be implemented to optimize on the configuration lookups. A handler for the transport is obtained based a configuration sub-class, and the message is dispatched to that handler. The handler uses the appropriate protocol library to send the message over that transport.

Embodiments of the data pump disclosed and described herein may be implemented using, for example, a general purpose computing device. Components of such a device may include, but are not limited to, various hardware components, such as a processing unit, data storage, such as a system memory, and a system bus that couples various system components including the data storage to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device may typically include a variety of computer-readable media, such as any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory includes computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by a processing unit. By way of example, and not limitation, data storage holds an operating system, application programs, and other program modules and program data.

Data storage may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media provide storage of computer-readable instructions, data structures, program modules and other data for the computer.

A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit through a user input interface that is coupled to the system bus, but may be connected by other interface and bus structures, such as a parallel port, game port or a universal serial bus (USB). A monitor or other type of display device may be also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

The computer may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer. The logical connections may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer may be connected to a public or private network through a network interface or adapter. Additionally, the service might be hosted in a data center, in multiple locations around the world for spatial efficiency and resilience. In some embodiments, a modem or other means for establishing communications over the network. The modem, which may be internal or external, may be connected to the system bus via the network interface or other appropriate mechanism. A wireless networking component such as comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for pushing data to a plurality of data sinks, the system comprising:
    a processor; and
    a memory coupled to the processor, the memory storing computer-readable instructions that, upon execution by the processor, cause the system to:
        publish a protocol specifying a data format supported by an assigned data sink of the plurality of data sinks, wherein the push service is tasked with pushing incoming data to the assigned data sink;
        receive a message indicating incoming data is available for delivery to the assigned data sink;
        schedule delivery of the incoming data from a push job queue to the assigned data sink; and
        create a new runtime instance of the push service that transforms incoming data according to the protocol supported by the assigned data sink.

2. The system of claim 1, the memory storing additional computer-readable instructions that, upon execution by the processor, cause the system to:
    accept an assignment of an additional assigned data sink to the push service, wherein the assignment of the additional data sink serves to additionally task the push service with pushing incoming data to the additional assigned data sink.

3. The system of claim 1, wherein the incoming data is retrieved from a data source and placed in an incoming data queue by a pull service component.

4. The system of claim 2, wherein the additional assignment of data sinks to the push service results from adjustments to a partitioning of the plurality of data sinks among a plurality of push service instances.

5. A method for pushing data to a plurality of data sinks, the method comprising:
    providing a push service for distributing incoming data to the plurality of data sinks;
    publishing a protocol specifying a data format supported by an assigned data sink of the plurality of data sinks, wherein the push service is tasked with pushing incoming data to the assigned data sink;
    receiving a message indicating incoming data is available for delivery to the assigned data sink;
    scheduling delivery of the incoming data from a push job queue to the assigned data sink; and
    creating a new runtime instance of the push service that transforms incoming data according to the protocol supported by the assigned data sink.

6. The method of claim 5, further comprising:
    accepting an assignment of an additional assigned data sink to the push service, wherein the assignment of the additional data sink serves to additionally task the push service with pushing incoming data to the additional assigned data sink.

7. The method of claim 5, wherein the incoming data is retrieved from a data source and placed in an incoming data queue by a pull service.

8. The method of claim 6, wherein the additional assignment of data sinks to the push service results from adjustments to a partitioning of the plurality of data sinks among a plurality of push service instances.

9. A computer-readable storage memory device comprising instructions for pushing data to a plurality of data sinks, wherein the instructions, when executed, cause a processor to:
    provide a push service for distributing incoming data to the plurality of data sinks;
    publish a protocol specifying a data format supported by an assigned data sink of the plurality of data sinks, wherein the push service is tasked with pushing incoming data to the assigned data sink;
    receive a message indicating incoming data is available for delivery to the assigned data sink;
    schedule delivery of the incoming data from a push job queue to the assigned data sink; and
    create a new runtime instance of the push service that transforms incoming data according to the protocol supported by the assigned data sink.

10. The computer-readable storage memory device of claim 9, further comprising instructions that, when executed, cause a processor to:
    accept an assignment of an additional assigned data sink to the push service, wherein the assignment of the additional data sink serves to additionally task the push service with pushing incoming data to the additional assigned data sink.

11. The computer-readable storage memory device of claim 9, wherein the incoming data is retrieved from a data source and placed in an incoming data queue by a pull service.

12. The computer-readable storage memory device of claim 10, wherein the additional assignment of data sinks to the push service results from adjustments to a partitioning of the plurality of data sinks among a plurality of push service instances.

\* \* \* \* \*